United States Patent [19]
Martin et al.

[11] 3,950,949
[45] Apr. 20, 1976

[54] METHOD OF CONVERTING LOW-GRADE HEAT ENERGY TO USEFUL MECHANICAL POWER

[75] Inventors: Cecil G. Martin; Paul F. Swenson, both of Cleveland, Ohio

[73] Assignee: Energy Technology Incorporated, Cleveland, Ohio

[22] Filed: Mar. 26, 1974

[21] Appl. No.: 455,020

[52] U.S. Cl. .................................. 60/641; 60/676
[51] Int. Cl.² .................. F01K 19/00; F01K 25/00
[58] Field of Search ............ 60/676, 641, 698, 682, 60/645, 647, 650, 651, 670, 671

[56] References Cited
UNITED STATES PATENTS
1,493,368  5/1924  Merz ...................................... 60/641
FOREIGN PATENTS OR APPLICATIONS
668,995  3/1952  United Kingdom .................. 60/682
262,112  5/1970  U.S.S.R. .............................. 60/682

Primary Examiner—Allen M. Ostrager
Attorney, Agent, or Firm—Daniel G. Blackhurst

[57] ABSTRACT

Specifically disclosed is a method of operating a vapor cycle engine wherein a vaporizable fluid is circulated in a closed loop serially through a first heat source, a second heat source, an expansion vapor engine, a condenser, and back to the first heat source. The method of operation specifically comprises the steps of heating the fluid in the first heat source to a relatively low temperature $t$, super-heating the fluid in the second heat source to a temperature $T$, passing the fluid through the expansion vapor engine and then exhausting the fluid from the engine at a temperature $T_2$ which is greater than the temperature $t$. Also disclosed is apparatus for specifically accomplishing the method as disclosed.

10 Claims, 10 Drawing Figures

METHOD OF CONVERTING LOW-GRADE HEAT ENERGY TO USEFUL MECHANICAL POWER

BACKGROUND OF THE INVENTION

The subject invention is directed in general toward the vapor power cycle art and, more particularly, to an improved vapor power cycle capable of efficiently using low-grade heat sources.

The invention is particularly applicable to the use of unfocused solar energy and geothermal energy as low-grade heat sources and will be described with particular reference thereto; however, as will become appreciated, the invention is not limited to solar or geothermal energy and could be used with many different types of low-grade heat sources.

In the past, numerous vapor cycle engines have been devised to convert low-grade heat energy (heat energy available only at relatively low temperature) to useful mechanical power. A basic problem inherent with all of these engines is poor energy conversion efficiency. The poor conversion efficiency is due to the limited thermodynamic potential, or temperature difference, existing between the low-grade heat energy and any normal heat sink.

Examples of low-grade heat energy which can be made available for conversion to mechanical power are solar energy, geothermal energy, ocean temperature gradients, process waste heat; incinerator exhaust, electric lighting heat, the exhaust gases from gas turbine or internal combustion engines; and combustion of low-heating value fuels such as garbage, dung, and other wet organic matter. To utilize energy from these sources, the engine must be capable of absorbing and utilizing low-grade (relatively low temperature) heat. Generally, the higher the temperature of heat absorption, the higher the portion of absorbed heat that can be converted to useful work. The higher the temperature of heat absorption, the less of the low-grade heat that will be available for absorption. This is because of the necessity to effect heat transfer from the low-grade heat source to the engine. That portion of the low-grade heat which remains below the absorption temperature will not be transferred to the engine, and hence escapes and is wasted. It is, in effect, not available to the engine. In the case of solar energy, the escaped heat represents the heat losses from the solar collector, whereas for the other applicable examples, the escaped heat leaves with the exhausted gas or liquid. Thus, for most applications of low-grade heat utilization, an optimum total output can be found from the availability of the heat for absorption by the engine, and the efficiency of utilization by the engine. For most examples of low-grade heat utilization, absorption occurs at 150°–300° F.

The engine must subsequently reject the heat to a sink, which will usually be atmospheric air, or a cooling tower or surface water where available. The engine's heat rejection temperature will have to be maintained somewhat above the temperature of the sink medium to effect the transfer of heat. This means at least an 80°–120°F engine heat rejection temperature in nearly all cases. Consequently, the thermodynamic potential is small between most low-grade heat sources and the common heat sinks. Moreover, engine efficiency is approximately proportional to the thermodynamic potential. Hence, the efficiency of engines using the common forms of low-grade heat are generally less than half that obtained with the higher temperatures available from conventional fuels, such as, coal, oil or gas. Even where the low-grade heat is available without charge, the cost of owning and operating the low-grade heat engine can be significant due to larger size per unit output increasing the cost of capital and maintenance. Thus, it is desirable to increase the efficiency of utilization of low-grade heat so that a maximum amount of useful work can be obtained from a given engine. Further, increased efficiency of low-grade heat utilization will contribute to the overall conservation of energy.

Another major limitation on energy input temperature in many instances is the concurrent fluid and vapor pressure resulting in the engine. For the typical steam vapor cycle engine, system pressure are often limited by codes and ordinances. In many applications, 20 psig is the maximum allowable operating pressure. For previously-used steam vapor cycle engines, system pressure limitations effectively impose an energy input temperature limitation on the operating cycle. The 20 psig limit corresponds, of course, to a 258°F limit on the temperature of heat input to the cycle.

BRIEF DESCRIPTION OF THE INVENTION

In general, one aspect of the subject invention is concerned with an improved method of designing and operating vapor cycle engines which, either because of constraints on operating pressure or use of low-grade heat as the energy input, boil the working fluid at a temperature lower than desirable for good thermal efficiency. The proposed method utilizes the application of superheat in a way not heretofore practiced.

Previously, superheat was generally practiced exclusively in conjunction with high-boiling temperature (and pressure) vapor cycle engines, usually of large power output, such as central station installations. There were several reasons for this, such as, for example:

1. The cost and complexity associated with superheating was easier to justify in systems with large power output; and,
2. The benefits of superheating were generally thought to be limited to high-boiling temperature (high pressure) cycles.

In addition to the factors noted above, it was not previously recognized that the benefits of superheat can be even more significant for low-boiling temperature vapor cycles than for the high-boiling temperature cycles where it was employed in the past.

The inventors of the subject invention have discovered that the application of superheat to low boiling temperature vapor cycle engines can be beneficial, and if practiced in a particular manner and to an adequate degree, can yield substantial and unexpected benefits. This holds true even of vapor cycle engines with boiling temperatures below 200°F, such as engines which may be applied to utilizing solar energy from non-focusing collectors. The inventors have found that the potential for efficiency improvement for low-boiling temperature vapor cycle engines achievable through the application of adequate superheat is even greater than the potential improvements which have previously been exploited for high-boiling temperature engines.

Specifically, in accordance with one aspect of the subject invention, there is provided a method of operating a vapor cycle engine of the type wherein a vaporizable fluid is circulated in a closed loop serially through a first heat source (generally a low-grade source), a second heat source (generally a high-grade source), an expansion vapor engine, a condenser, and back to the first heat source, comprising the steps of:

a. Heating the fluid in the first heat source to a relatively low temperature $t$ to vaporize at least a major portion of the fluid (generally temperature $t$ will be less than 300°F);

b. Superheating the fluid in the second heat source to raise its temperature to T (preferably T will be in a range above approximately 600°F); and, thereafter, c. Passing the superheated fluid through the expansion vapor engine and exhausting the fluid from the engine at a temperature $T_2$ which is greater than $t$ (that is, the steam or vapor is still in the superheated condition when exhausted).

A further, somewhat more limited aspect of the invention, contemplates the additional step of passing the fluid exhausted from the expansion engine at temperature $T_2$ in heat exchange relationship with the fluid being conducted to the second heat source. Preferably, the fluid has substantially completed vaporization in the first heat source at a comparatively low pressure, and when passed in heat exchange relationship with the fluid exhausted from the vapor engine, a first increment of superheat is added.

An additional, somewhat limited aspect of the invention, contemplates the further step of passing the vapor exhausted from the vapor engine in heat exchange relationship with the fluid supplied from the condenser to the first heat source. Preferably, both superheating and fluid preheating are accomplished by the vapor exhausted from the vapor expansion engine.

An additional aspect of the invention is the beneficial employment of reheat, in combination with the use of superheat (as above), and preferably also in combination with one or the other or both means of heat extraction from the exhaust of the vapor expansion engine.

A further aspect of the invention is concerned with a particular cycle structure which permits the various method aspects listed above to be simply and efficiently carried out.

OBJECTS OF THE INVENTION

Accordingly, the primary object of the subject invention is the provision of a method for operating a vapor cycle engine on low-grade heat energy supplied at low temperature to achieve greatly-improved efficiency when compared to the manner in which such engines are now employed under similar circumstances.

A further object is the provision of a series of improved operating steps to the basic method to further improve engine efficiency, which steps may be applied either singly or in various combinations to meet the needs of a given application.

A still further object of the invention is the provision of apparatus particularly suited for efficiently converting low-grade heat to useful mechanical power.

A still more limited object is the provision of a vapor cycle engine system which is capable of effectively using geothermal energy, solar energy, or similar low-grade energy in combination with high-grade energy such as is obtainable from conventional fossil fuels.

BRIEF DESCRIPTION OF THE DRAWINGS

The above and other objects and advantages will become apparent from the following description when read in conjunction with the accompanying drawings wherein.

DETAILED DESCRIPTION OF THE INVENTION

Figure 1:
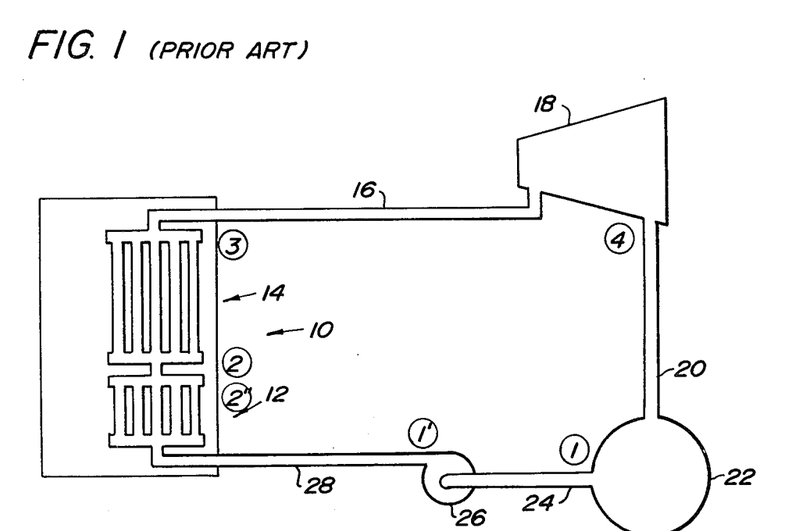
FIG. 1 is a schematic diagram illustrating a typical prior art apparatus for recovering low-grade heat.
Figure 2:
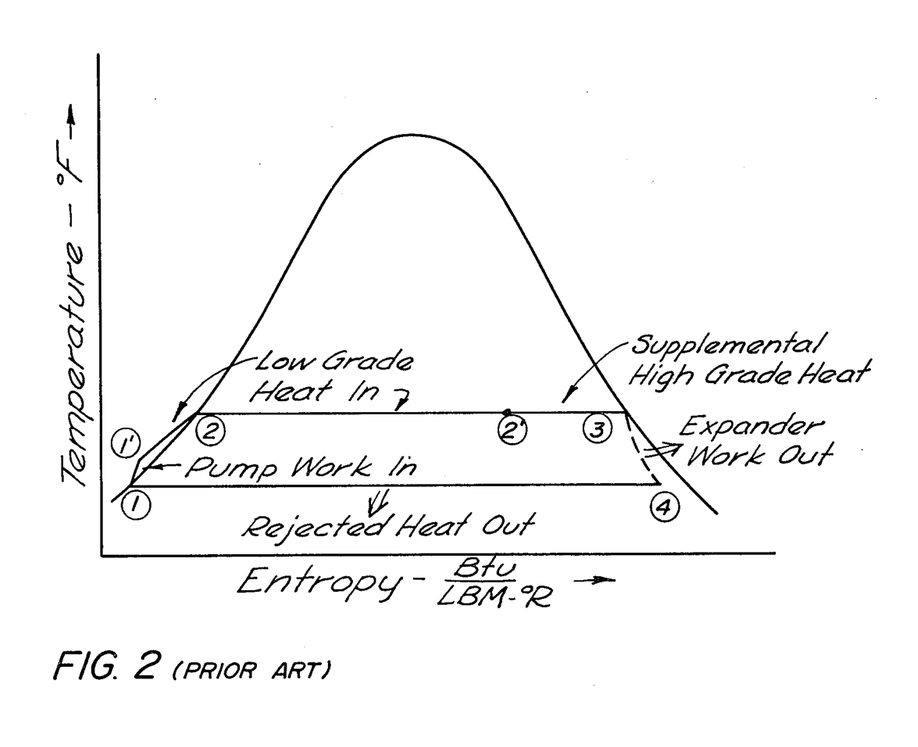
FIG. 2 is a temperature-entropy (T-S) thermodynamic cycle diagram of a prior art Rankine cycle previously used with low-grade heat.

Referring more particularly to the drawings wherein the showings are for the purposes of explaining and disclosing the preferred embodiment of the invention only, and not for the purpose of limiting same, FIGS. 1 and 2 show a typical prior art system and method for recovering and using low-quality heat energy with a low-boiling temperature Rankine vapor cycle or engine.

Broadly, from an apparatus standpoint, the typical prior art vapor cycle energy recovery system included a heat exchanger 10 including a liquid preheater section 12 and a boiler section 14. As can be appreciated, unit 10 was heated by any of a variety of low temperature heat sources mentioned earlier. The output from the boiler section 14 was conducted through a pipe 16 to the inlet of an expansion engine 18. Typically, expansion engine 18 comprised a turbine. After passing through the turbine 18, the fluid was exhausted through a line 20 to a conventional condenser 22 wherein it was condensed back to its liquid state and thereafter removed from the condenser to a line 24 by a pump 26 which increased the pressure of the fluid back to the boiler pressure and supplied it to the preheater section 12.

The following table illustrates typical state point and efficiency results for a prior art cycle of the type shown in FIG. 1 operated according to the usual methods:

TABLE 1

| | | Example 1, Saturated Rankine Cycle | | |
|---|---|---|---|---|
| *State Point | Pressure Psia | Temperature °F | Enthalpy BTU/LBM | Entropy BTU/LBM-°R |
| 1 | 1 | 102 | 70 | .133 |
| 2 | 10 | 193 | 161 | .284 |
| **2' | 10 | 193 | varies | varies |
| 3 | 10 | 193 | 1143 | 1.788 |

TABLE 1-continued

| | | Example 1, Saturated Rankine Cycle | | |
|---|---|---|---|---|
| *State Point | Pressure Psia | Temperature °F | Enthalpy BTU/LBM | Entropy BTU/LBM-°R |
| 4 | 1 | 102 | 1035 | 1.852 |

η= 0.10
*State Points on Figures 1 and 2.
**Point at which high-grade heat must supplement low-grade heat.
Note: Expander efficiency is 75% for all examples.

The column titled "State Point" of Table 1 shows the characteristics of the fluid (i.e., water in the examples) at various points in the cycle. The state pointers are numbered 1–4 and corresponding numbers appear on FIGS. 1 and 2 to identify the corresponding state points in the system. The method operates as follows:

1. The liquid (water in the Example 1 of Table 1) enters pump 26 at point 1, and is raised in pressure to point 1'; corresponding to boiler pressure.

2. The pressurized liquid is then heated to the saturation temperature in preheater 12, whence boiling begins (point 2). Liquid heating is usually accomplished with the low-grade heat source which also contributes to boiling.

3. Liquid working fluid enters the boiler section 14 at point 2.

4. Heat energy is added to the fluid in the boiler section 14, causing vaporization. The heat will normally be low-grade heat energy or, if and when more system output is needed than can be satisfied by the low-grade source, high-grade heat, as needed on a supplementary basis. Vaporization proceeds by means of low-grade heat to point 2', and by high-grade heat to the boiler exit state point 3, corresponding to saturated vapor.

5. The saturated vapor enters the expander 18 and expands to point 4, corresponding to the pressure level in the condenser 22. Work is done by the expander as it removes energy from the expanding fluid.

6. The fluid exiting the expander 18 will be a wet vapor in most cases. It enters the condenser 22, where heat is rejected to surroundings, accomplishing complete condensing of the fluid to the liquid state.

The example of prior art vapor cycle engine operation described above provides heat input to the working fluid exclusively in the form of energy to produce boiling. This is typical of prior art operation for low-boiling temperature engines. These engines are, as stated above, often operated with low-grade energy available only at limited temperature. The best utilization of this energy often coincides with the boiling only, or saturated cycle, as all of the heat is absorbed by the engine at some constant, maximum available temperature. The addition of superheat has in the prior art appeared to be without benefit in these cases, since:

1. A separate, high-grade energy supply must be made available; and,

2. The more superheat that is added, the more energy that remains unused in the expander exhaust. This happens at very low levels of superheat for low-boiling temperature cycles, since the engine expansion ratio is too low to recover the energy as useful work.

The disadvantages with the prior art vapor cycle engines of the type just described have been explained in substantial detail in the introductory portion of the subject application. In general, the efficiency of such vapor cycles using the commonly-available forms of low-grade heat generally tend to be less than half that obtained with the higher temperatures available from conventional fuels. However, systems constructed and operated in accordance with the subject method tend to provide a substantial increase in overall system efficiency in a manner which is relatively unexpected.

Broadly, in the subject method, the vapor, which is generated at relatively low temperature as in the previously-described prior art system, is heated again to relatively high temperature after leaving the boiler before it enters the expander. Preferably, and in accordance with an aspect of the subject invention, the vapor is heated to a temperature such that after it passes through the expander, it is still at a temperature higher than it was after leaving the boiler. Generally, the second heating is accomplished by means of a high-grade heat source, such as the combustion of a conventional fuel of the nature of gas, oil or coal. Moreover, highly-focused solar radiation can be used as the high-grade heat source if desired.

Figure 3:
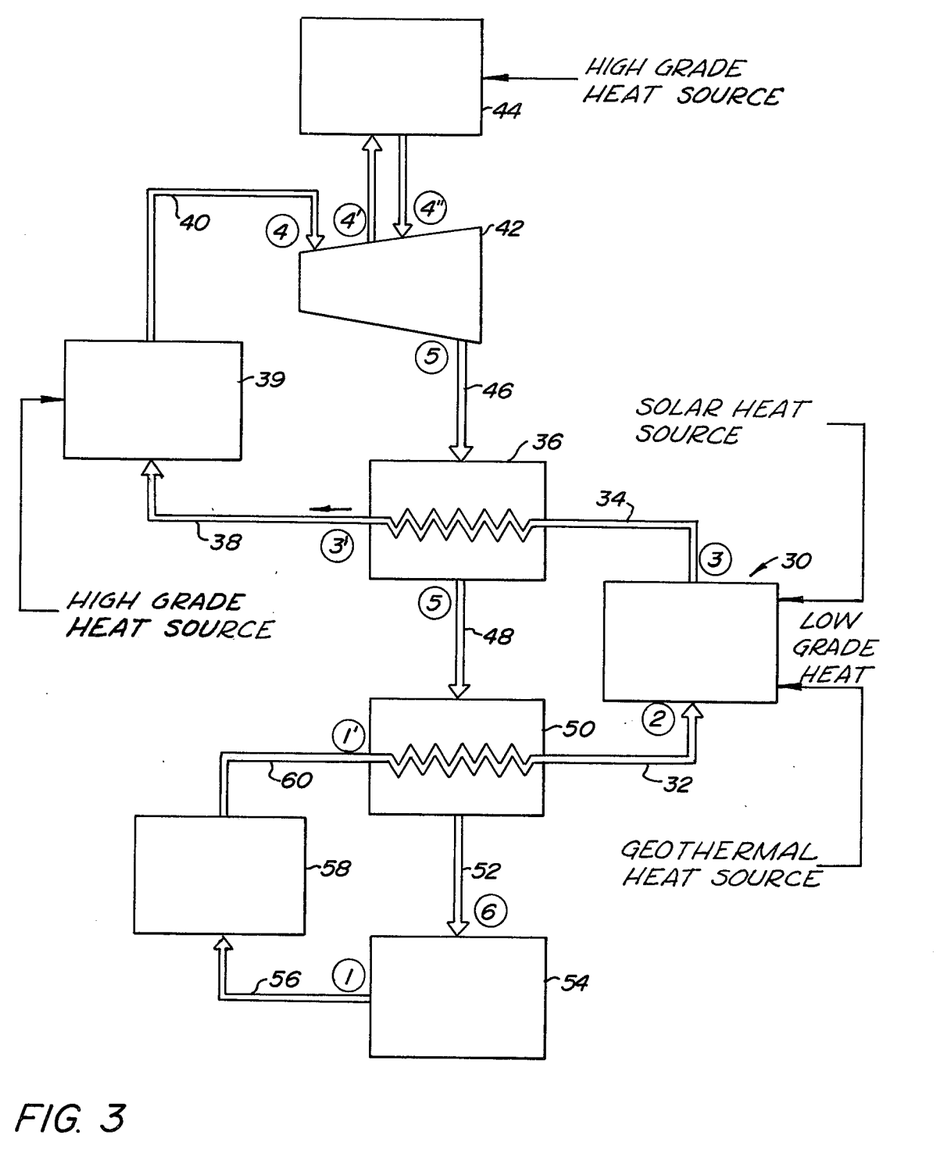
FIG. 3 is a schematic diagram of a vapor cycle engine apparatus incorporating a basic method of the subject invention with certain improvements thereto.

FIG. 3 illustrates in schematic form an apparatus or system which can be used for carrying out the inventive method. The schematic diagram of FIG. 3 illustrates apparatus which cannot only carry out the basic method which will subsequently be described, but also apparatus which incorporates certain improved steps which can be added to the basic method. The basic method and each of the improved methods will subsequently be described in detail and their relationship to one another explained. However, for the present, it should be noted that schematic of FIG. 3 illustrates a system which includes a first boiler or heat exchanger unit 30 arranged to receive liquid (e.g., water) through line 32 and heat it through the use of low-grade heat sources to saturation temperature. In this embodiment a dual system of low-grade heat sources is employed; namely, geothermal and unfocused solar energy. The saturated vapor leaving the boiler 30 is conducted through a line 34 to a vapor phase regenerator 36 which provides a first increment of superheat to the vapor. Thereafter, the superheated vapor is conducted through a line 38 to a superheated 39 which supplies the final increments of superheat. In accordance with the subject invention, the superheater 39 is heated by a high-grade heat source which, as noted above, can be supplied by high-focused solar radiation, combustion of conventional fossil fuels, or the like. The degree of superheat supplied to the vapor is relatively critical to the subject invention and will hereafter be described in some detail. The superheated steam or vapor leaving the superheater unit 39 is conducted through a lne 40 to the inlet of an expansion engine 42. In the subject embodiment, the expansion engine 42 is illustrated as a conventional turbine. Associated with the expansion engine 42 is a reheater 44 which receives the steam after it has given up some of its energy in the expander and reheats it a substantial amount after which it is reconducted to the expansion engine 42.

In accordance with one aspect of the subject invention, the reheater 44 is heated by a high-grade heat source which can be the same heat source used to heat superheater 39. Alternatively, other heat sources can be used for the reheater as long as they are capable of supplying heat at the desired high temperatures, e.g., in a range generally above 800°F.

From the expander 42, the vapor (still in a superheated condition) is passed through line 46 to the vapor phase regenerator 36 where it heats the fluid coming through the vapor phase regenerator from line 34. After passing through the vapor phase regenerator, the vapor supplied from line 46 is conducted through line 48 to a liquid phase regenerator 50 which serves to preheat the liquid being supplied to the boiler 30. In accordance with customary practice, the vapor from line 48, after giving up a portion of its heat to the liquid passing through line 32, is conducted through a line 52 to a conventional condenser 54 where it is recondensed to the liquid phase and thereafter supplied through a line 56 and feed pump 58 to the liquid side of the liquid phase regenerator through line 60.

As mentioned earlier, the apparatus just described is capable of carrying out the basic inventive method as well as certain of the improvements incorporated therein. The basic method of operation can best be understood by reference to the temperature-entropy diagram of FIG. 4 and the following Table 2. The basic method of operation eliminates the use of the vapor phase regenerator, the liquid phase regenerator, and the reheater. That is, these three elements of apparatus can be eliminated and substantial improvements of operation achieved by use of the basic method.

Figure 4:
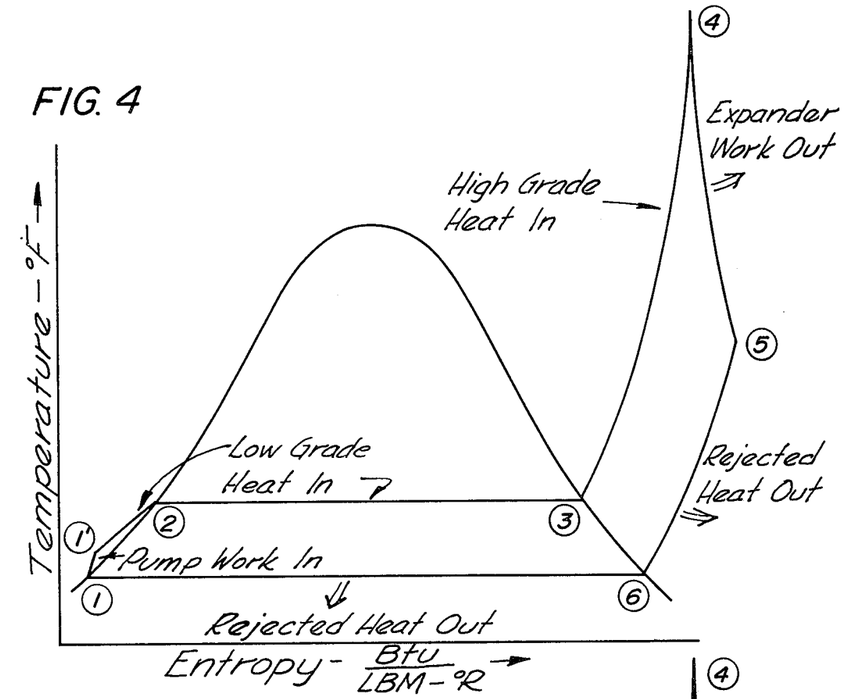
FIG. 4 is a temperature-entropy thermodynamic cycle diagram of the basic method of the subject invention.

Referring more specifically to FIG. 4 and the Table 2, the typical state points when operating according to the basic method are set forth and the corresponding points identified by the same numerals in the Table and in FIGS. 3 and 4.

TABLE 2

Example 2, Subject Operating Cycle

| ***State Point | Pressure Psia | Temperature °F | Enthalpy BTU/LBM | Entropy BTU/LBM-°R |
|---|---|---|---|---|
| 1 | 1 | 102 | 70 | .133 |
| 2 | 10 | 193 | 161 | .284 |
| 3 | 10 | 193 | 1143 | 1.788 |
| 4 | 10 | 1000 | 1535 | 2.176 |
| 5 | 1 | 560 | 1318 | 2.253 |

$\eta = 0.15$
***State Points on Figures 3 and 4.
Note: Expander efficiency is 75% for all examples.

As noted, the subject method of operation is shown on FIG. 4 and the thermodynamic state points are tabulated on the above shown Table 2. In general, the following sequence of operation takes place with the basic method:

1. From point 1, where the liquid (in this case water) exits the condenser 56 to point 2, where the preheated liquid enters the vapor generating portion of the boiler 30, the method proceeds essentially as in the prior art.

2. The heat added to the fluid in the boiler will ordinarily be entirely low-grade heat. This is in contrast to the need that often arises in prior art engines of supplementing boiling with high-grade heat. Practice of the subject method reduces the need for energy to achieve boiling to less than half that needed in many prior art engines. Thus, supplemental boiling energy will be needed much less frequently.

3. The saturated vapor exits the boiler at (3) and enters superheater 39 which is supplied with high-quality energy on a basis separate from the boiler 30.

4. The superheated vapor exits the superheater at point 4, and enters the expander. The temperature of the vapor at the superheater exit will be limited by the properties of the materials in the superheater as is the case with the prior art high-temperature boiling superheated engines. An advantage of the subject method is that the lower pressures associated with low-temperature boiling require much thinner walls in the superheater tubes, or alternatively, a less expensive superheater material with lower allowable stress, or, as a third option, use of still higher superheater temperature than allowable with the same tubes when practicing the prior art method of operation.

As noted, the superheater 39 will generally be supplied with energy from a high-grade heat source.

5. The superheated vapor enters the expander 42, expanding as in the prior art method to condenser pressure. At the high temperature over which the whole expansion takes place when practicing the subject method of operation, much more work is available for extraction in the expander, and hence the enthalpy conversion is considerably greater than with the prior art. (Compare Tables 1 and 2).

The vapor exits the expander at 5 preferably still at elevated temperature relative to the boiler (i.e., in superheated condition).

6. Practice of the method results in all of the energy present at the expander exit being rejected to the surroundings. This may be accomplished in the condenser, although a separate device, such as a liquid spray desuperheater, would usually be less costly.

7. The saturated vapor enters the condenser 54 at point 6, and is condensed as with practice of the prior art method.

The degree of superheating preferred and the reasons therefor will not be described in detail. However, as noted earlier, the superheating should generally be such that after exiting from the expansion engine 42 (point 5, FIG. 2), the vapor is still in a superheated condition.

Figure 5:
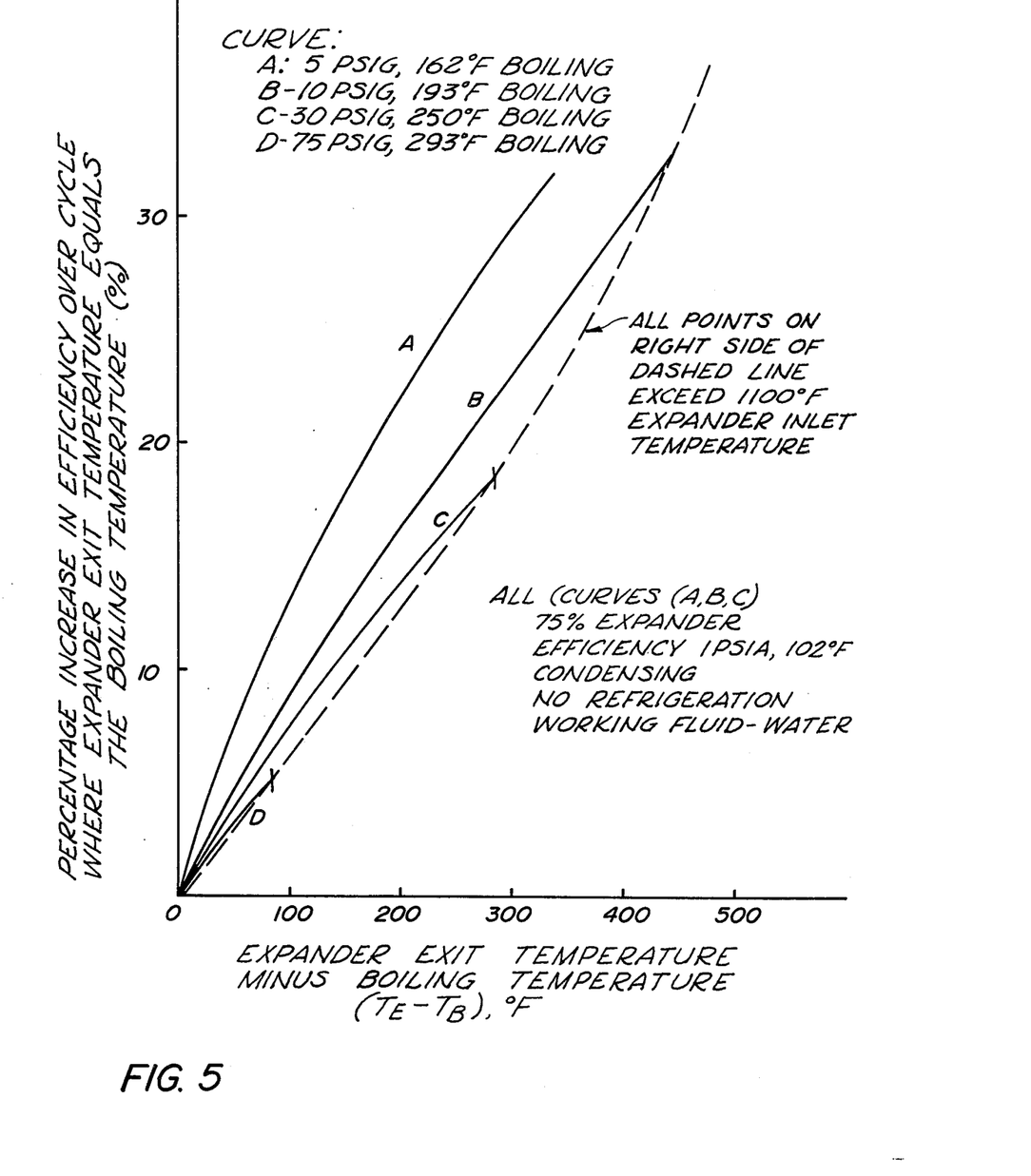
FIG. 5 are curves showing the percentage increase in cycle efficiency obtained by allowing expander exhaust temperature to exceed the boiling temperature.

FIG. 5 illustrates the benefits which accrue through practice of the subject method. The benefit in engine operating efficiency is here expressed in terms of $\eta \eta T_e = T_b$, where $\eta T_e = T_b$ is the engine efficiency when the expander exit temperature is equal to the cycle boiling temperature, and where $T_e$ is the expander exit temperature (point 5 on FIG. 4) and $T_b$ is the cycle boiling temperature. The data on FIG. 5 corresponds to an expander efficiency of 75%, and a condenser temperature of 1 psia. Other values for these parameters will affect the precise location of the curves on FIG. 5, but not their behavior. It is clear that for any cycle boiling temperature below 335°F (for the case of water, used here as the example working fluid) the greater the value of $(T_e - T_b)$, the greater the benefit which accrues to engine operating efficiency.

An additional relationship shown by FIG. 5 is that within the constraint of a maximum value for superheater exit temperature, the lower the boiling temperature, the greater the potential benefit through application of the subject method. The constraint of a maximum superheater exit temperature is a reality in any vapor cycle engine application. The exact value of the maximum will not alter the facts that (1) low-boiling temperature cycles benefit more, and that (2) there is a maximum cycle boiling temperature above which there is no benefit. The exact value of the cut-off cycle boiling temperature above which there are no benefits to be realized through the practice of the subject method will depend to some extent on:

1. Expander efficiency.
2. Condenser temperature.
3. Maximum superheat temperature.

To summarize, benefits will be maximum when:

1. Boiling temperature is low (e.g., below 335°F).

2. Expander efficiency is low (e.g., below 80%).

3. Condenser temperature is high (e.g., above 100°F).

4. Maximum allowable superheater exit temperature is high (e.g., above 600°F).

Referring again to the prior art method of operating low-boiling temperature vapor cycle engines, it can be seen that the operating conditions necessary for maximizing the benefits of the subject method (see above) are generally the conditions which are avoided in the prior art engines. These conditions all tend to increase the amount of energy present in the expander exit, which, as stated above, has had the appearance of being undesirable. When superheat is practiced to the extent that $T_e \geq T_b$, then there is no method or means in the prior art which can serve to effectively reclaim the resulting energy present in the expander exhaust, and such operation, if ever considered, would appear to be highly wasteful and a condition to be avoided. The inventors of the subject method have found, however surprising, that this condition is precisely what is needed to maximize the overall efficiency of low-boiling temperature vapor cycle engines, despite the appearance of waste. The potential benefits are greatest when practiced in conjunction with low-boiling temperature engines, or engines operated under other conditions which tend to reduce the amount of work otherwise available from the expander, such as low expander efficiency and high condenser temperature (see above).

The desirability of practicing the subject method can be explained simply in terms of the thermodynamic properties of vapors in the superheated state. Inspection of a temperature (or Enthalpy)-Entropy diagram with constant pressure lines shown reveals that in the superheat region, the enthalpy difference available for conversion to work between any two pressure levels is maximized by performing the expansion process at the highest temperature possible. The inventors have discovered that maximizing the work available from the expansion process by causing it to occur at the highest temperature consistent with prevailing system design criteria results in much improved engine efficiency relative to practice of prior art methods of operating low-boiling pressure engines. This is as noted above despite the fact that by doing so, the entire expansion process proceeds and even terminates at temperature levels above the boiling temperature for the case of low-boiling temperature engines, for which practice of this method yields the greatest benefits.

IMPROVEMENTS TO THE METHOD

The method described above can be further improved in several ways. The practice of the subject method leads to an increase in the amount of energy present in the expander exit relative to operating with the prior art method. This is due to the high level of superheat being employed through practice of the subject basic method. This energy can be reclaimed in several ways.

The method employed in the prior art of transferring heat from the expander exhaust to the liquid feed being supplied to the boiler can be employed in combination with the subject method, as shown on the Temperature-Entropy diagram of FIG. 4. The diagram of FIG. 6 corresponds to the same method of vapor cycle engine operation as shown on FIG. 4, with the additional step of liquid phase regeneration (i.e., adding a liquid phase regenerator 50). The following Table 3 shows typical state points for operation with a liquid phase regenerator.

TABLE 3

| | Example 3, Subject Operating Cycle, with Liquid Phase Regeneration | | | |
|---|---|---|---|---|
| *State Point | Pressure Psia | Temperature °F | Enthalpy BTU/LBM | Entropy BTU/LBM-°R |
| 1 | 1 | 102 | 70 | .133 |
| 2 | 10 | 193 | 161 | .284 |
| 3 | 10 | 193 | 1143 | 1.788 |
| 4 | 10 | 1000 | 1535 | 2.176 |
| 5 | 1 | 560 | 1318 | 2.253 |
| 5' | 1 | 370 | 1227 | 2.157 |

$\eta = 0.16$

Figure 6:
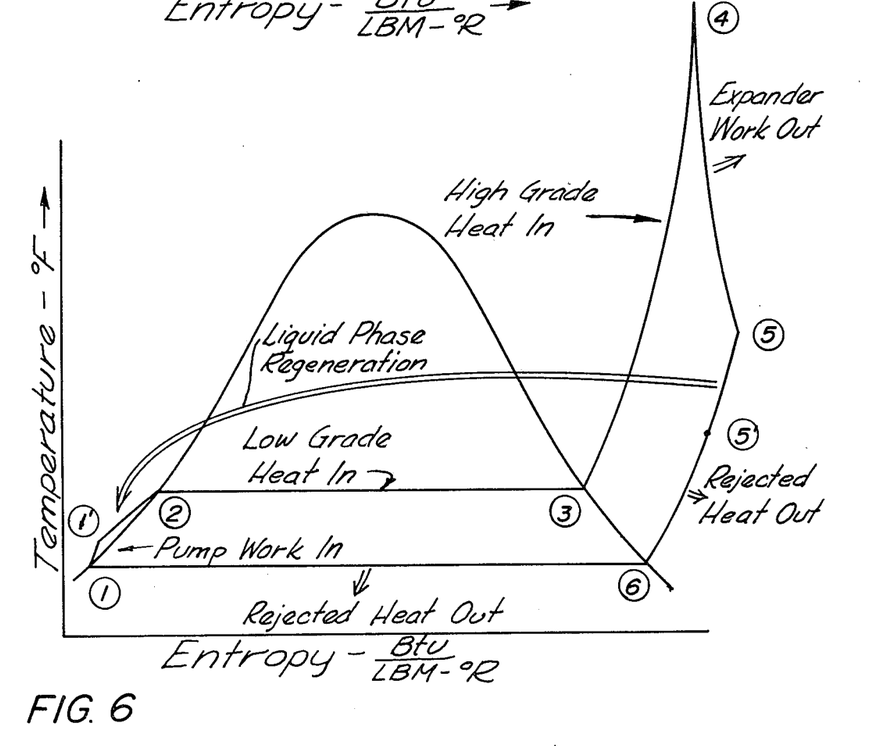
FIG. 6 is a temperature-entropy thermodynamic cycle diagram of the subject vapor cycle with the addition of a liquid phase regeneration included.

*State Points on Figures 3 and 6.

This additional step is incorporated as follows:

1. The vapor exiting the expander 42 (point 5, Table 3) is placed in heat exchange relationship with the liquid being supplied to the boiler 30 (point 2).

2. The heat exchange is accomplished in a counter-flow manner, with the hottest vapor exiting the expander and entering the regenerator 50 in heat exchange relationship with the hottest feed liquid, exiting the regenerator and entering the boiler (point 2). Likewise, the coolest vapor exiting the regenerator is in heat exchange relationship with the coolest liquid entering the regenerator (point 1').

An improvement in system operating efficiency can be seen relative to operation under the same method, but without liquid phase regeneration (Table 2, FIG. 5).

An additional improvement, which is uniquely suited to the subject method, incorporates the regeneration of energy in the expander exit for use in superheating the vapor exiting the boiler (i.e., addition of a vapor phase regenerator 36). This is possible only when $T_e > T_b$, and is thus uniquely applicable to the subject method. The improvement is illustrated on FIG. 7 and the following Table 4, corresponding to the Temperature-Entropy diagram and tabulated state points, respectively, for the subject method incorporating this improvement.

TABLE 4

| | Example 4, Subject Operating Cycle, with Vapor Phase Regeneration | | | |
|---|---|---|---|---|
| **State Point | Pressure Psia | Temperature °F | Enthalpy BTU/LBM | Entropy BTU/LBM-°R |
| 1 | 1 | 102 | 70 | .133 |
| 2 | 10 | 193 | 161 | .284 |
| 3 | 10 | 193 | 1143 | 1.788 |
| 3' | 10 | 550 | 1310 | 1.993 |
| 4 | 10 | 1000 | 1535 | 2.176 |
| 5 | 1 | 560 | 1318 | 2.253 |
| 5' | 1 | 203 | 1151 | 2.052 |

$\eta = 0.17$

Figure 7:
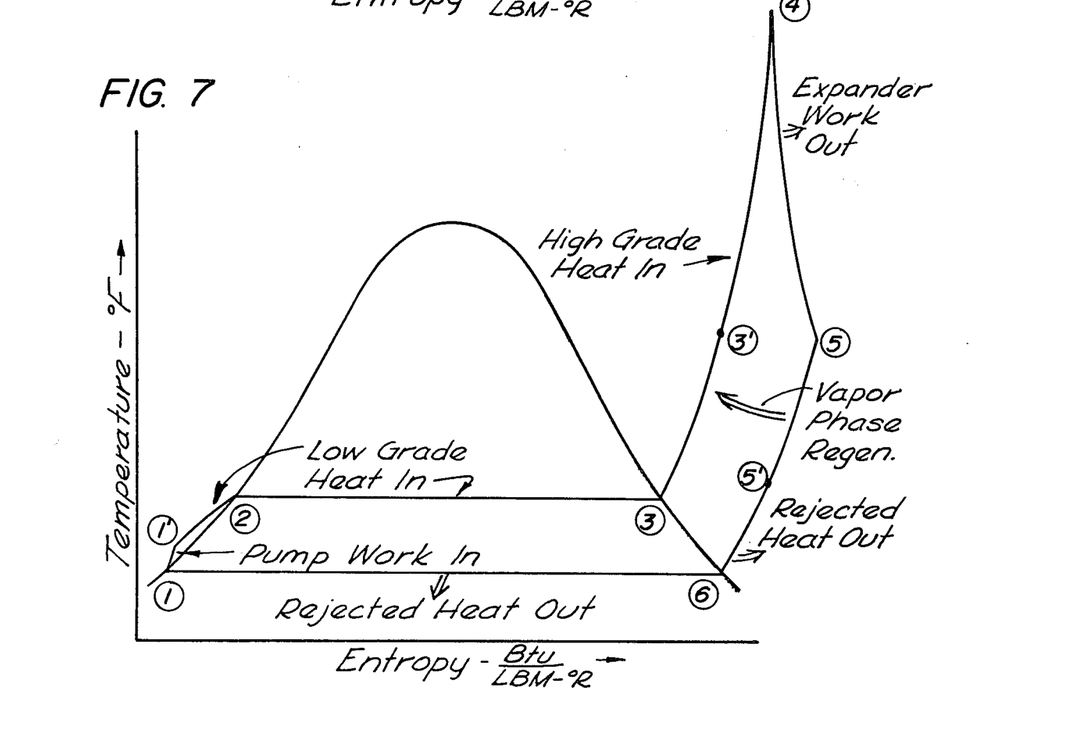
FIG. 7 is a temperature-entropy thermodynamic cycle diagram of the subject vapor cycle with vapor phase regeneration included.

**State Points on Figures 3 and 7.

The improvement operates as follows:

1. The vapor exiting the expander 42 (point 5, Table 4) is placed in heat exchange relationship with the vapor exiting the first stage of superheat (point 3') by passing it through the regenerator 36.

2. The heat exchange is accomplished in a counter-flow manner, with the hottest vapor in the turbine exit path (point 5) in heat exchange relationship with the hottest vapor in the first stage of superheat (point 3'). Likewise, the coolest vapor in the turbine exit path (point 5') is placed in heat exchange relationship with the coolest vapor in the first stage of superheat (point 3).

Comparing the efficiency of an engine, employing this improvement to the subject method, as shown on Table 4, to that corresponding to the unimproved subject method, as shown on Table 2, reveals the benefit in operating efficiency.

A further improvement, which is suited to the subject method in combination with one or both of the prior improvements, is reheat. The employment of reheat is illustrated on FIG. 8 and the following Table 5, the Temperature-Entropy diagram and tabulated state points, respectively.

TABLE 5

Example 5, Subject Operating Cycle, With Reheat and Vapor Phase Regeneration

Figure 8:
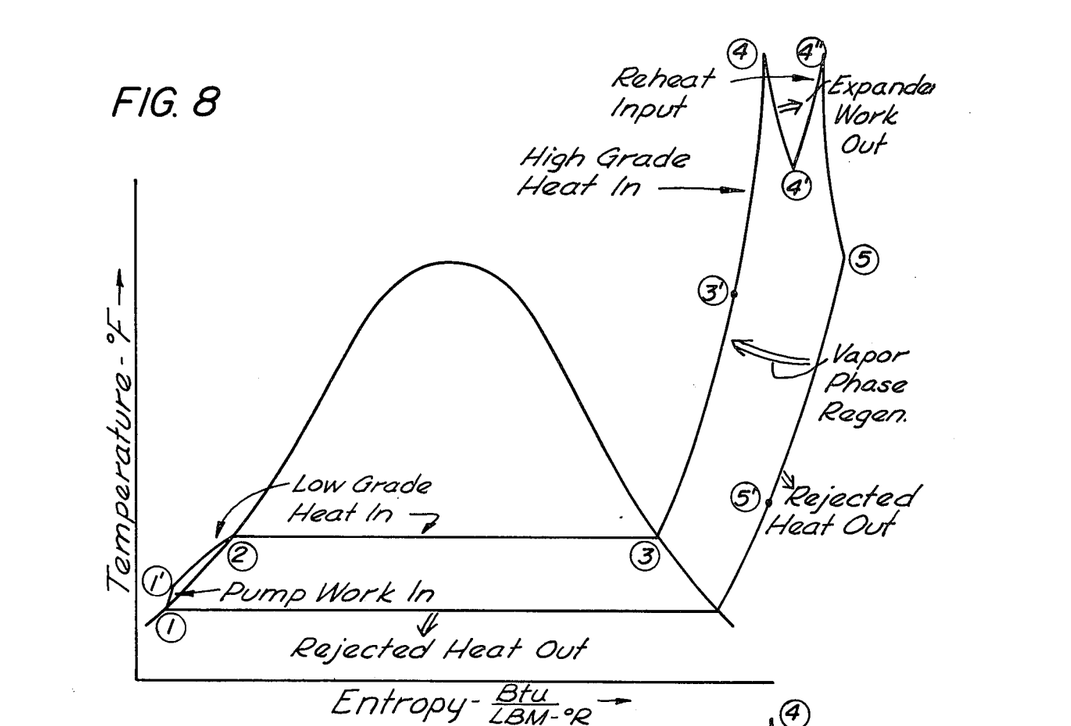
FIG. 8 is a temperature-entropy thermodynamic cycle diagram of the subject vapor cycle with reheat and vapor phase regeneration.

| *State Point | Pressure Psia | Temperature °F | Enthalpy BTU/LBM | Entropy BTU/LBM-°R |
|---|---|---|---|---|
| 1 | 1 | 102 | 70 | .133 |
| 2 | 10 | 193 | 161 | .284 |
| 3 | 10 | 193 | 1143 | 1.788 |
| 3' | 10 | 700 | 1384 | 2.060 |
| 4 | 10 | 1000 | 1535 | 2.176 |
| 4' | 4 | 800 | 1435 | 2.202 |
| 4'' | 4 | 1000 | 1535 | 2.277 |
| 5 | 1 | 715 | 1392 | 2.321 |
| 5' | 1 | 203 | 1151 | 2.052 |

η = 0.18
*State Points on Figures 3 and 8.

Here, reheat is employed in combination with vapor phase regeneration. The portion of the illustrated improvement which embodies heat operates as follows:

1. Vapor is withdrawn from the expander 46 at point 4' (Table 5), and is heated.
2. Heat is provided by a high-grade heat source, which can be the same source as is used for superheating, so that the vapor raised in temperature, to 4''. This temperature will be limited in the same manner as the maximum superheater temperature.
3. The vapor then re-enters the expander (point 4'') and continues expanding to point 5, where it enters the vapor phase regenerator, as described previously.

With the employment of the reheat improvement, even more energy is present in the expander exit than with the employment of the subject improvement alone. Thus, the benefits due to reheat are greatest when one form or other of regeneration is also employed. For the example cited here, vapor phase regeneration is employed.

The benefits attributable to each of the improvements (or combination thereof) described above are summarized in the following Table 6. The unimproved method, and a Rankine engine with no modification are also shown for comparative purposes.

TABLE 6

Summary of Operating Cycle Results

| Example No. | 1 | 2 | 3 | 4 | 5 |
|---|---|---|---|---|---|
| Condensing Temp. | 102°F | 102°F | 102°F | 102°F | 102°F |
| Boiling Temp. | 193°F | 193°F | 193°F | 193°F | 193°F |
| Upper Cycle Temp. | 193°F | 1000°F | 1000°F | 1000°F | 1000°F |
| Expander Efficiency | 75% | 75% | 75% | 75% | 75% |
| Vapor Phase Regeneration | No | No | No | Yes | Yes |
| Liquid Phase Regeneration | No | No | Yes | No | No |
| Reheat | No | No | No | No | Yes |
| Cycle Efficiency | 10% | 15% | 16% | 17% | 18% |

ADDITIONAL IMPROVEMENTS TO SUBJECT METHOD AND APPARATUS

The subject method of vapor cycle engine operation may be advantageously employed by an engine which receives low-grade heat for boiling from a source whose availability is limited by the temperture of utilization. Such sources can be characterized by FIG. 9, which corresponds to (A) a source of pressurized hot water at 500°F, such as would originate in a geothermal well, and (B) a solar collector.

Figure 9:
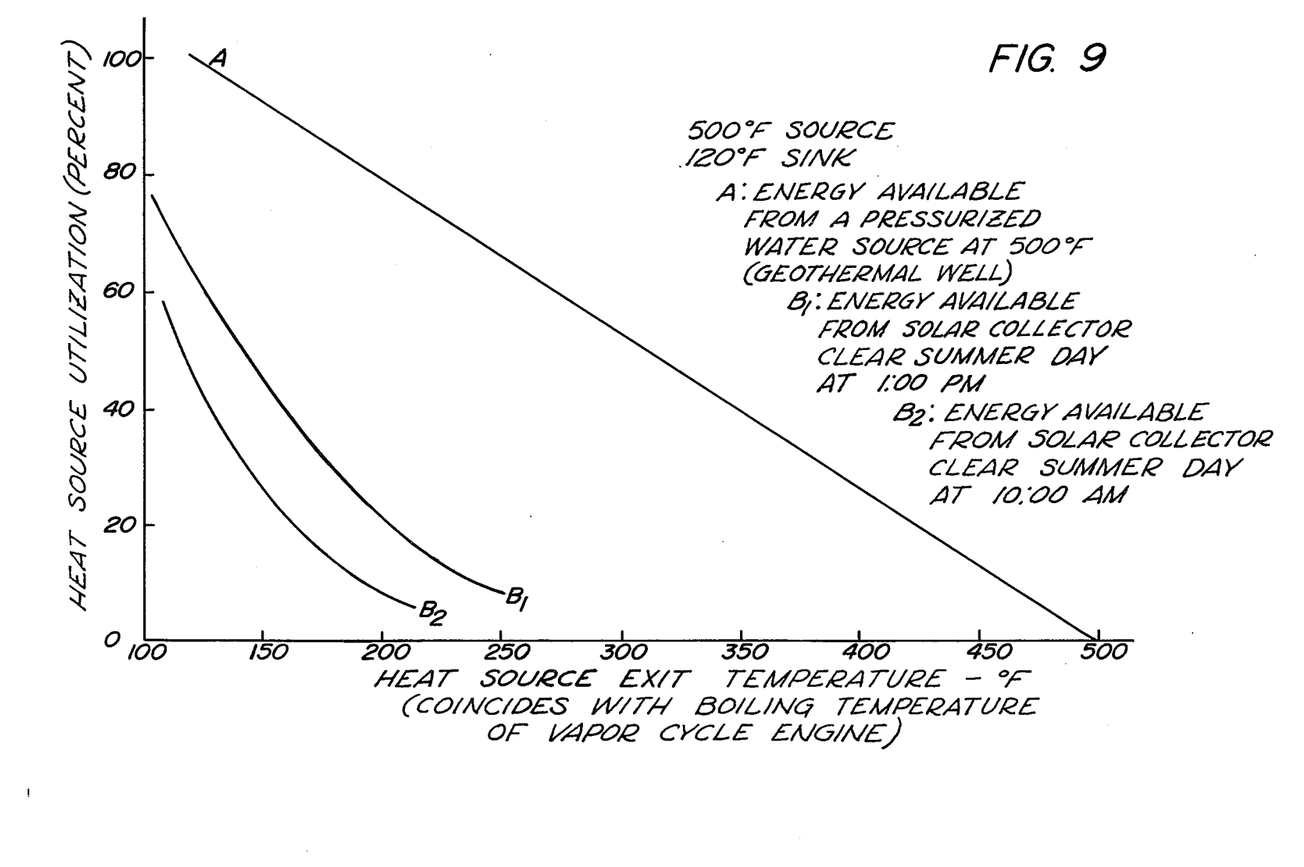
FIG. 9 is a curve showing effective utilization of a heat source relative to the available heat sink (several types of heat sources are shown); and, FIG. 10 shows a family of curves illustrating the net conversion efficiency relative to boiling temperature for one of the sources given in FIG. 9.

Both sources are more fully utilized when they are employed to boil fluid in the vapor cycle engine at minimum temperature. In the limit, maximum utilization efficiency relative to the available sink will occur only when the boiling is performed at the sink temperature. As described earlier, however, the efficiency of the vapor engine increases with boiling temperature, and hence an optimization must be performed in selecting the boiling temperature which produces the maximum net conversion efficiency of source energy to engine output. The inventors have discovered that the optimization will produce a different result, depending on whether the engine is operated by previous methods, the subject basic method or the subject method incorporating one or more of the subject improvements. This discovery has not been heretofore practiced by persons concerned with the efficient utilization of geothermal wells or solar collectors. This is because:

1. The subject method has not been previously practiced.
2. The optimization of utilization of such heat sources has not been previously attempted where vapor engines were employed using any degree of superheat, whether or not as instructed by the subject method.
3. Superheat to any degree has not been previously employed by vapor engines utilizing energy from geothermal or solar sources.

Figure 10:
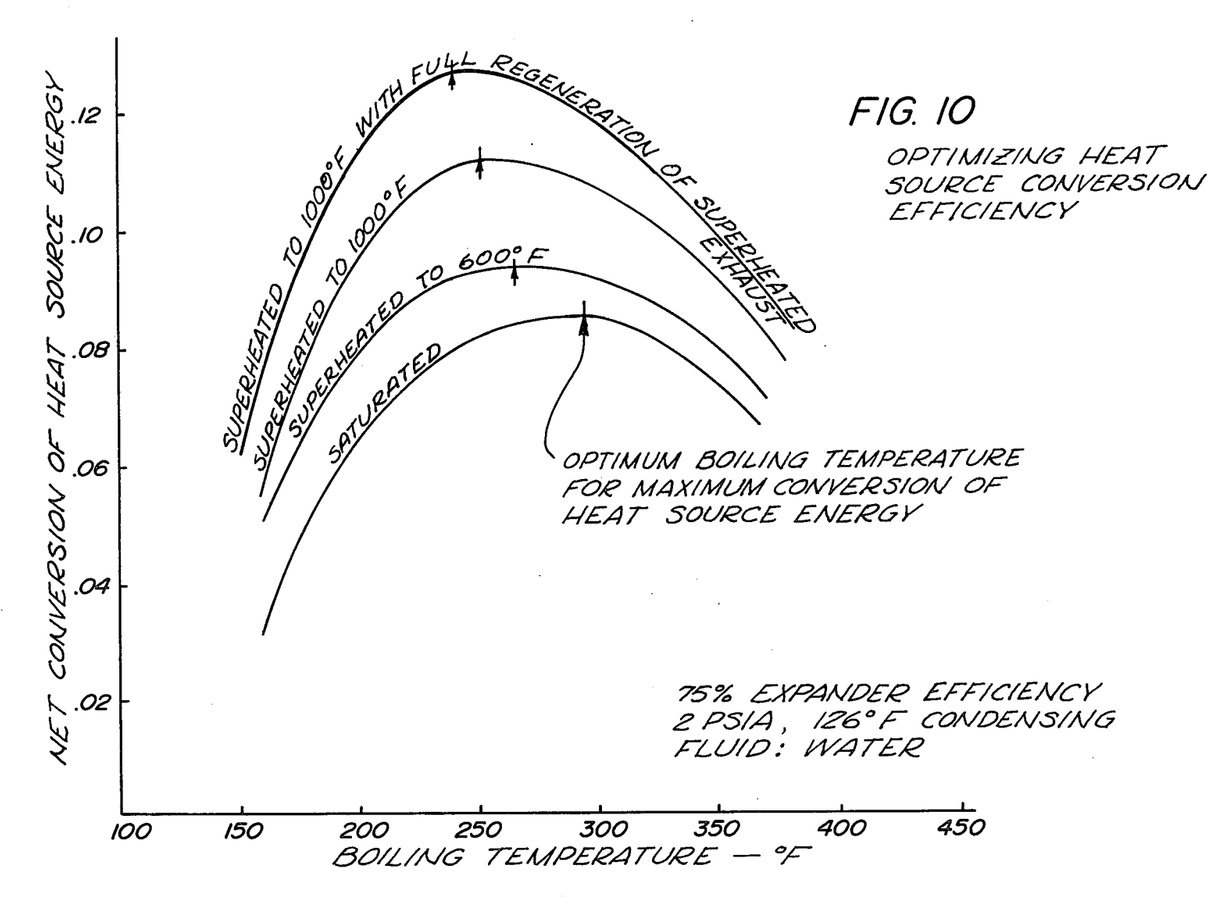

The results of several sample optimizations are shown on FIG. 10. All correspond to utilization of a heat source characterizing a geothermal well, as given by line A on FIG. 10. Several points can be drawn:

1. The engine operating by the previous method optimizes at a higher boiling temperature than engines operating by the subject method. Thus, containment of the resulting vapor pressure will cause increased costs for practice of the previous method.
2. The subject method provides a better conversion efficiency of source energy.
3. The subject method as improved provides even better conversion efficiency.

The use of the dual heat sources is illustrated on FIG. 3 in which a particular preferred embodiment of such an engine is indicated. As shown, both geothermal energy and solar energy are employed as low-temperature energy sources. In the preferred embodiment, the geothermal energy can be utilized for base-load power generation, and the solar energy as a supplement for peak loads which normally coincide with the times of day when maximum sunlight is available.

As can be seen from the foregoing, the subject method and its various improvements offer extreme and substantial improvements over the prior method of recovering low-quality heat energy. Improvements of 50% and more over the prior art method are achieved by the addition of superheat to a level such that the temperature of the steam exiting from the expansion engine is above the temperature of boiling in the system. The subject method and apparatus make possible recovery of heat from said low temperature sources in a manner not previously deemed possible.

The invention has been described in great detail sufficient to enable one of ordinary skill in the power art to make and use the same. Obviously, modifications and alterations of the preferred embodiments will occur to others upon a reading and understanding of the specification. It is our intent to include all such modifications and alterations as part of our invention insofar as they come within the scope of the appended claims.

What is claimed is:

1. A method of operating a vapor cycle engine of the type wherein a vaporizable fluid is circulated in a closed loop serially through a first heat source, a second heat source, an expansion vapor engine, a condenser, and back to the first heat source, comprising the steps of:
   a. heating the fluid in the first heat source to a relatively low temperature $t$ to vaporize at least a major portion of the fluid:
   b. conducting the fluid from said first heat source to said second heat source to superheat the fluid and raise its temperature to T: and, thereafter,
   c. passing the superheated fluid through the expansion vapor to extract useful energy therefrom and then exhausting the fluid from the engine at a temperature $T_2$ which is greater than $t$ and thereafter conducting said fluid through said condenser and back to said first heat source.

2. The method as defined in claim 1 including the additional step of passing at least a portion of the fluid exhausted from the expansion engine in heat exchange relationship with the fluid being conducted to the second heat source to supply a first increment of superheat to the fluid.

3. The method as defined in claim 2 including the additional step of using at least a portion of the fluid exhausted from the expansion vapor engine to preheat the fluid conducted from the condenser back to the first heat source.

4. The method as defined in claim 1 wherein said first heat source is selected to have a temperature no greater than approximately 300°F and wherein said second heat source is selected such that it can raise the temperature of said fluid to over 600°F.

5. The method as defined in claim 1 wherein said first heat source comprises solar energy and said second heat source comprises combusted fossil fuel.

6. The method as defined in claim 1 wherein said first heat source comprises geothermal energy.

7. In a vapor power cycle system wherein a vaporizable fluid is vaporized in a boiler at a relatively low pressure by a low-temperature heat source and conducted to an expansion engine wherein it expands and gives up a portion of its useful energy, after which it is condensed at a pressure lower than the pressure within said boiler and subsequently returned to said boiler, the improved method of operating said system comprising the step of providing a second relatively high-temperature heat source and superheating the vaporized fluid in said second heat source prior to conducting said fluid to said expansion engine, said superheating being to a temperature such that after exhausting from said engine said fluid is still at a temperature above the maximum temperature it reaches in the boiler.

8. The method as defined in claim 7 including the step of taking the fluid exhausted from said engine and conducting it in heat exchange relationship with the vaporized fluid prior to superheating said vaporized fluid in said second heat source.

9. The method as defined in claim 7 including the step of conducting the fluid exhausted from said engine in heat exchange relationship with the fluid supplied to the low-temperature heat source.

10. In a system wherein a vaporizable fluid is vaporized in a boiler at a pressure below approximately 30 psig and conducted through an expansion engine wherein it gives up useful energy to drive said engine, and is subsequently condensed at a pressure below the pressure in said boiler and thereafter returned to said boiler, the improved method of operating said system comprising the step of superheating said fluid prior to conducting it through said engine to raise the temperature of such fluid to a point such that after being conducted through said engine it is still a temperature above the maximum temperature it reached in said boiler.

* * * * *